United States Patent [19]

Victora et al.

[11] Patent Number: 5,858,565
[45] Date of Patent: *Jan. 12, 1999

[54] MAGNETO-OPTIC COMPOSITIONALLY MODULATED STRUCTURE

[75] Inventors: Randall H. Victora, Rochester; Charles F. Brucker, Fairport; Tukaram K. Hatwar, Penfield, all of N.Y.

[73] Assignee: Eastman Kodak Company, Rochester, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 685,741

[22] Filed: Jul. 24, 1996

Related U.S. Application Data

[60] Provisional application No. 60/007,293 Nov. 9, 1995.
[51] Int. Cl.$^6$ .............................. G11B 5/66; B32B 15/01; H01F 10/10
[52] U.S. Cl. ........................... 428/694 SC; 428/694 MM; 369/13
[58] Field of Search ..................... 428/694 ML, 694 SC, 428/694 MT, 694 MM, 694 GR, 694 T, 694 TM; 369/13, 272, 283, 288

[56] References Cited

U.S. PATENT DOCUMENTS 5,400,307  3/1995  Ochiai et al. .............................. 369/13

FOREIGN PATENT DOCUMENTS 61-240455  4/1985  Japan .
60-233810  11/1985  Japan .

OTHER PUBLICATIONS

Solid State Communications, vol. 84, No. 4, pp. 413–415, 1992, Magnetic And Magneto–Optical Kerr Studies in Compositionally Modulated FE/BI Films, by R. Krishnan and H. Lassri. (no month).

Abstract AC06 of the 6th Joint MMM–Intermag Conference (1994), Magnetic Properties of CO/BI And CO/PB Superlattices: Theory And Experiment, by R. Victora and C. Brucker, (no month).

Journal of Applied Physics, 59, No. 7, Apr. 1985, pp. 2514–2520, Magnetic Properties Of Amorphous TB–FE Thin Films With An Artificially Layered Structure, by N. Sato.

Journal of Applied Physics, 69 (8), Apr. 1991, pp. 5989–5991, Magneto–Optic And Optical Characterization Of TB/CO Compositionally Modulated Amorphous Films, by L. Chen, P. He, S. Nafis, W. McGahan, J. Woollam, D. Sellmyer.

H. Brandle et al, Optical and Magneto–Optical Characterization of Evaporated Co/Pt Alloys and Multilayers, IEEE Transactions on Magnetics, vol. 28, No. 5, Sep. 1992.

Primary Examiner—John J. Zimmerman
Assistant Examiner—Michael LaVilla
Attorney, Agent, or Firm—Raymond L. Owens

[57] ABSTRACT

A compositionally modulated magneto-optic structure includes a plurality of layers defining a layer stack, the overall layer stack including the elements Tb, Fe, and Pb; or the elements Tb, Co, and Pb; or the elements Tb, Fe, and Bi; or the elements Tb, Co and Bi.

15 Claims, 4 Drawing Sheets

MAGNETO-OPTIC COMPOSITIONALLY MODULATED STRUCTURE

CROSS REFERENCE TO RELATED APPLICATION

Reference is made to and priority claimed from U.S. Provisional Application Ser. No. US 60/007,293, filed 09 Nov. 1995, entitled MAGNERO-OPTIC COMPOSITION-ALLY MODULATED STRUCTURE.

FIELD OF THE INVENTION

The present invention relates to magneto-optic compositionally modulated structures such as structures used for storage.

BACKGROUND OF THE INVENTION

Currently, most devices designed for carrying information that can be read magneto-optically, such as magneto-optic recording disks, contain a layer of a rare-earth transition metal alloy such as TbFeCo. This material offers adequate performance for current applications at optical wavelengths of 680 nm–830 nm, but is known to suffer drastic decreases at the shorter wavelengths expected in future magneto-optical drives. In particular, the figure of merit (taken to be the reflectivity times the Kerr rotation) and thus the carrier are greatly reduced at wavelengths such as 430 nm. In addition, a higher carrier would be appreciated at the current wavelengths because this would allow for less stringent drive specifications.

Previous attempts to address this problem have been numerous. Frequently, dopants have been added to the rare-earth transition metal alloy. Prominent examples mentioning the two elements described in this patent are Japanese published patent applications J61-240455 and J60-233810.

The formation of Fe/Bi compositionally modulated films was described in Solid State Communications 84, pp 413–415, 1992 (R. Krishnan and H. Lassri). Values for the figure of merit are not explicitly mentioned but can be inferred from the Kerr data to be poor. The material lacks perpendicular anisotropy, therefore measurements of recording performance are impossible. The formation of Co/Bi and Co/Pb superlattices was described in Abstract AC-06 of the 6th Joint MMM-Intermag Conference (1994) (RH. Victora and C.F. Brucker). Again, no perpendicular anisotropy was developed and thus the material could not be tested as a magneto-optical recording medium.

The formation of Fe/Tb multilayers is described in Journal of Applied Physics 59, pp 2514–2520, 1986 (N. Sato) and the formation of Co/Tb multilayers is described in Journal of Applied Physics 69, pp 5989–5991, 1991 (L.-Y. Chen, P. He, S. Nafis, W. A. McGahan, J. A. Woollam, and D. J. Sellmyer). Neither of these materials demonstrate improved figure of merit.

Other uses for these compositionally modulated structures would include magnetic recording media, Faraday isolators, or light modulators.

SUMMARY OF THE INVENTION

It is an object of this invention to provide an improved magneto-optic structure with larger Kerr rotation.

This object is achieved by a compositionally modulated magneto-optic structure, comprising a plurality of layers defining a layer stack, the overall layer stack including the elements Tb, Fe, and Pb; or the elements Tb, Co, and Pb; or the elements Tb, Fe, and Bi; or the elements Tb, Co and Bi.

ADVANTAGES

It is an important feature of this invention that, relative to current recording structures, it possesses a much larger figure of merit.

The present invention has an important advantage relative to the previously discovered Pb and Bi doped alloys of possessing a much larger figure of merit and coercivity at comparable composition.

It has the advantage relative to the previously disclosed Fe/Bi compositionally modulated material of possessing perpendicular anisotropy and, apparently, a much larger figure of merit. (They do not use optically thick samples for their Kerr rotation measurements, thus precluding exact knowledge of their true performance.)

It has the advantage relative to the previously disclosed Co/Pb and Co/Bi superlattices of possessing perpendicular anisotropy.

The previously disclosed Fe/Tb and Co/Tb superlattices do not claim a figure of merit superior to even standard TbFeCo.

DETAILED DESCRIPTION OF THE PREFERRED EMBODIMENTS

Figure 1:
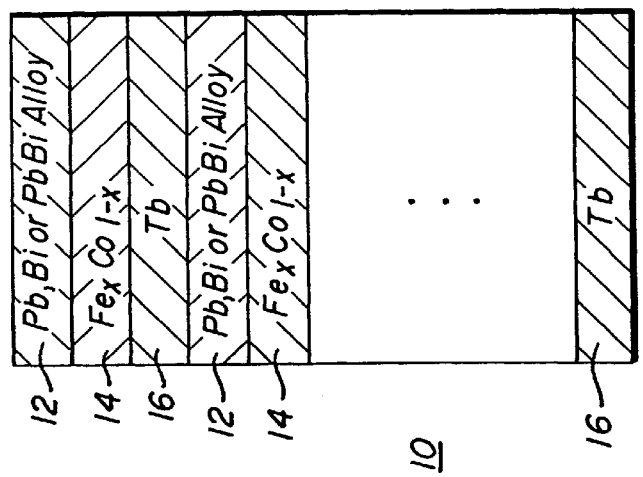
FIG. 1 shows, in cross section, a magneto-optic recording structure in accordance with the present invention.

FIG. 1 shows a magneto-optic structure 10 in accordance with the invention. It will be understood that this structure can be applied in devices which necessarily will include a supporting structure.

The structure 10 includes a compositionally-modulated structure with three repeating layers 12, 14, and 16: layer 16 includes Tb, layer 14 includes $Fe_xCo_{1-x}$ where $0 \leq x \leq 1$, and layer 12 includes $Pb_yBi_{1-y}$ where $0 \leq y \leq 1$. The above listing of the layers is not meant to constrain the order of deposition. This set of layers, often including many repetitions of the basic three layer sequence, is called a layer stack. Structures in accordance with this invention might also be called a superlattice (although superlattices typically have sharper interfaces) or it might be called a multilayer (although multilayers typically have fewer total layers).

Figure 2:
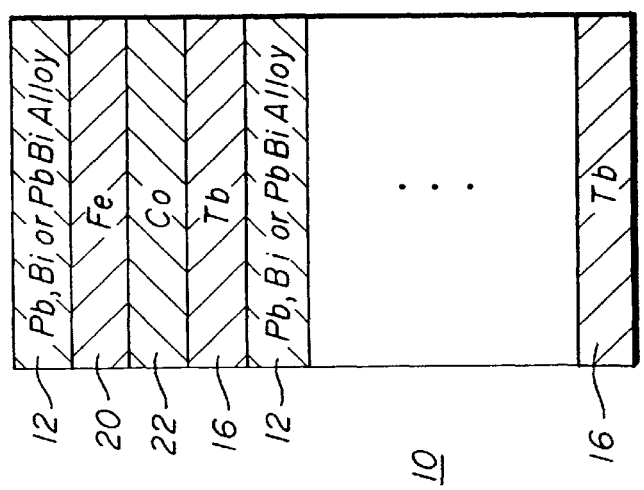
FIG. 2 shows another magneto-optic recording structure in accordance with the present invention.

FIG. 2 shows a different magneto-optic structure 10. In this embodiment the compositionally modulated structure includes four repeating layers. Where the same elements are used in a layer as in FIG. 1, they will carry the same numbers. So, for example, layer 16 is Tb, and layer 12 is $Pb_yBi_{1-y}$ $0 \leq y \leq 1$. Further, this embodiment includes a layer 20 of Fe, and a layer 22 of Co. This structure yields comparable performance to the three-layer material provided that the Fe and Co layers are adjacent. Otherwise, the above listing of the layers is not meant to constrain the order of deposition. This set of of layers, often including many repetitions of the basic four layer sequence, is called a layer stack.

Figure 3:
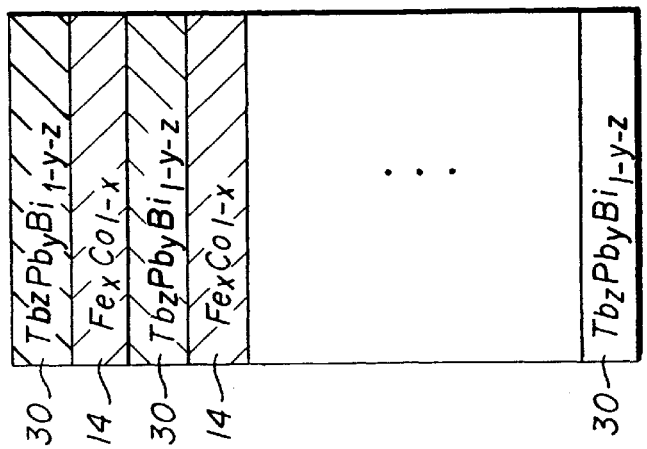
FIG. 3 shows still another magneto-optic recording structure in accordance with the present invention.

FIG. 3 shows a magneto-optic structure 10 which has a compositionally modulated structure including two repeating layers: one layer 14 of $Fe_xCo_{1-x}$ where $0 \leq x \leq 1$ and one layer 30 of $Tb_zPb_yBi_{1-y-z}$ where $0 \leq y \leq 1-z$ and $0<z<1$. The above listing of the layers is not meant to constrain the order of deposition; either layer may be deposited first. This set of layers, often including many repetitions of the basic two layer sequence, is called a layer stack.

Figure 4:
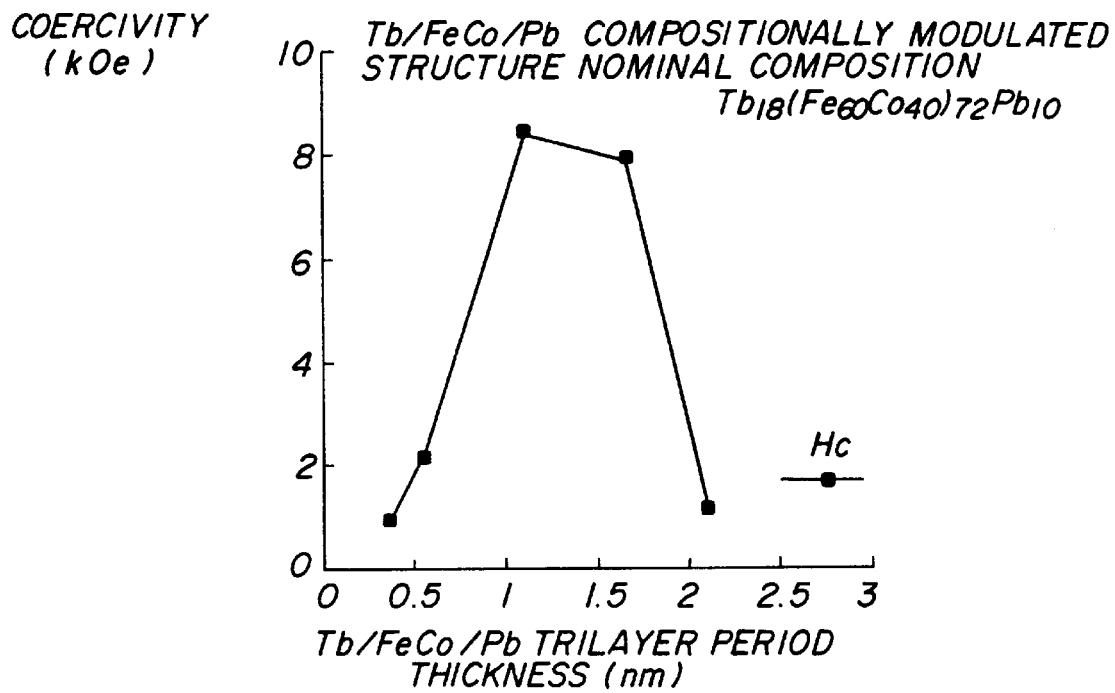
FIG. 4 is a graph which plots coercivity vs. trilayer periods and illustrates the variation of coercivity for different trilayer periods.

FIG. 4 shows a plot of coercivity vs trilayer period for a structure containing 18 atomic percent Tb, 72 atomic percent $Fe_{0.6}Co_{0.4}$, and 10 atomic percent Pb. It demonstrates that there is an optimal (approximately 1–2 nm for these atomic percentages) period for the generation of coercivity.

Compositionally modulated structures were deposited using dc-magnetron sputtering in inert gas from targets with a diameter of 5 cm. The targets were isolated from each other by baffles to help prevent crosstalk except for deposition of the two layer structures where the baffle separating Pb and Tb targets was removed. The individual layer thicknesses were controlled by the deposition rate and the rotation rate of the substrate holder. Typical sputtering conditions were 10 mtorr Kr pressure, 6 standard cubic centimeters per minute Kr flow rate, 5 cm target to substrate distance, and 20 rpm substrate holder rotation rate. It is expected that other gases such as Ar and Xe can be used.

The following structures provide figure of merit (defined as reflectivity times $\theta_m$ (measured in degrees) where $\theta_m$ squared equals the Kerr rotation squared plus the Kerr ellipticity squared) greater than 0.05 when measured at a wavelength of 780 nm.

A. A three layered structure can be made according to the following four constraints:
1. The thickness of the $Fe_xCo_{1-x}$ layer is greater than 0.4 nm.
2. The thickness of the Tb layer does not exceed 140% of the thickness of the $Fe_xCo_{1-x}$ layer.
3. The thickness of the $Pb_yBi_{1-y}$ layer does not exceed 120% of the thickness of the $Fe_xCo_{1-x}$ layer.
4. The thickness of the Tb layer plus twice the thickness of the $Pb_yBi_{1-y}$ layer does not exceed 280% of the thickness of the $Fe_xCo_{1-x}$ layer.

B. Another three layered structure can be made according to the following three constraints:
1. The thickness of the $Fe_xCo_{1-x}$ layer is greater than 0 nm.
2. The thickness of the Tb layer does not exceed 140% of the thickness of the $Fe_xCo_{1-x}$ layer.
3. The thickness of the $Pb_yBi_{1-y}$ layer does not exceed 60% of the thickness of the $Fe_xCo_{1-x}$ layer.

C. A four layered structure can be made according to the following four constraints:
1. The combined thicknesses of the Fe and Co layers is greater than 0.4 nm.
2. The thickness of the Tb layer does not exceed 140% of the combined thickness of the Fe and Co layers.
3. The thickness of the $Pb_yBi_{1-y}$ layer does not exceed 120% of the combined thickness of the Fe and Co layers.
4. The thickness of the Tb layer plus twice the thickness of the $Pb_yBi_{1-y}$ layer does not exceed 280% of the combined thickness of the Fe and Co layers.

D. Another four layered structure can be made according to the following three constraints:
1. The combined thicknesses of the Fe and Co layers is greater than 0 nm.
2. The thickness of the Tb layer does not exceed 140% of the combined thickness of the Fe and Co layers.
3. The thickness of the $Pb_yBi_{1-y}$ layer does not exceed 60% of the combined thickness of the Fe and Co layers.

E. A two layered structure can be made according to the following four constraints:
1. The thickness of the $Fe_xCo_{1-x}$ layer is greater than 0.4 nm.
2. The thickness of the $Tb_zPb_yBi_{1-y-z}$ layer multiplied by the atomic percentage of Tb within the layer does not exceed 140% of the $Fe_xCo_{1-x}$ layer thickness.
3. The thickness of the or $Tb_zPb_yBi_{1-y-z}$ layer multiplied by the combined atomic percentage of Pb and Bi within the layer does not exceed 120% of the $Fe_xCo_{1-x}$ layer thickness.
4. The thickness of the $Tb_zPb_yBi_{1-y-z}$ layer multiplied by the combined atomic percentage of Pb and Bi within the layer does not exceed 280% of the $Fe_xCo_{1-x}$ layer thickness minus the thickness of the $Tb_zPb_yBi_{1-y-z}$ layer.

F. Another two layered structure can be made according to the following three constraints:
1. The thickness of the $Fe_xCo_{1-x}$ layer is greater than 0 nm.
2. The thickness of the $Tb_zPb_yBi_{1-y-z}$ layer multiplied by the atomic percentage of Tb within the layer does not exceed 140% of the $Fe_xCo_{1-x}$ layer thickness.
3. The thickness of the $Tb_zPb_yBi_{1-y-z}$ layer multiplied by the combined atomic percentage of Pb and Bi within the layer does not exceed 60% of the $Fe_xCo_{1-x}$ layer thickness.

Figure 5:
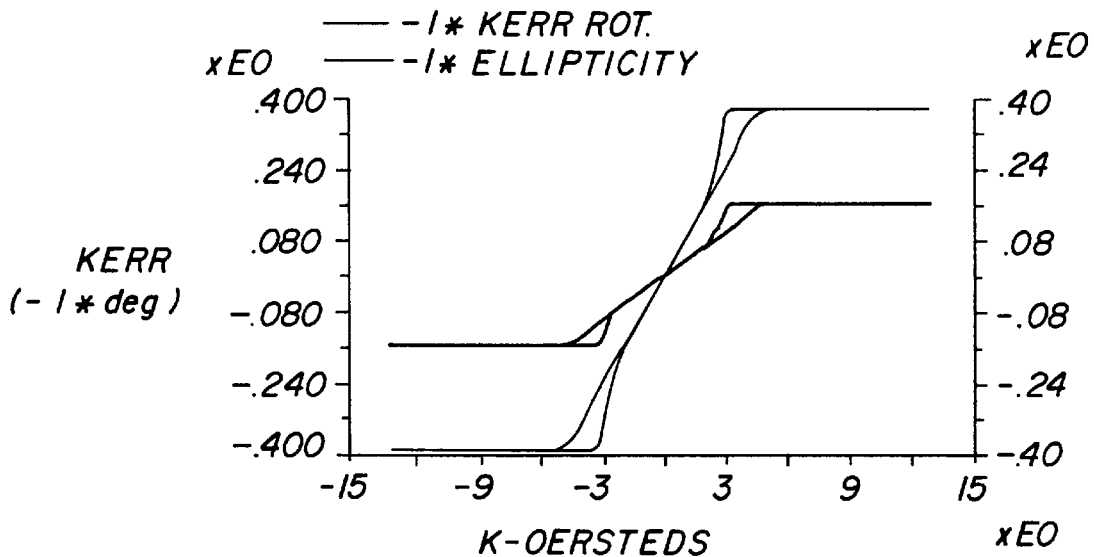
FIG. 5 shows a Kerr hysteresis loop plot of Kerr rotation vs. applied magnetic field for Example 1.

The following are examples of magneto-optic structures that have been made in accordance with the invention:

A. 0.28 nm Tb/0.4 nm Fe/0.2 nm Co/0.3 nm Bi has maximum Kerr rotations of 0.45, 0.42, and 0.35 and figure of merit 0.27, 0.23, 0.16 at wavelengths of 780, 650, and 430 nm, respectively. This structure offers very large Kerr rotations and figures of merit. $Tb_{0.22}Fe_{0.67}Co_{0.11}$ (a standard recording alloy) possesses Kerr rotations of 0.30, 0.27, and 0.23 and figure of merit 0.17, 0.14, and 0.09 at wavelengths of 780 nm, 650 nm, and 430 nm, respectively. Therefore, Example A has a figure of merit approximately 70% larger than a standard recording alloy over a broad spectrum of wavelengths. A hysteresis loop is shown in FIG. 5. This material might be suitable for use as a magneto-optical recording read layer exchange-coupled to another magnetic material.

Figure 6:
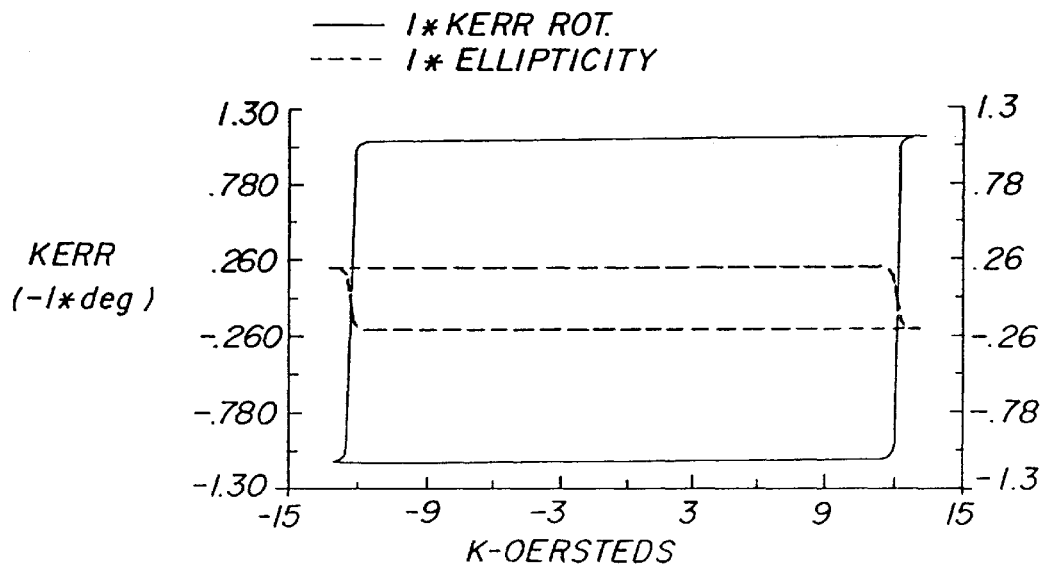
FIG. 6 shows a Kerr hysteresis loop plot of Kerr rotation vs. applied magnetic field for Example 2.

B. 0.44 nm Tb/0.5 nm $Fe_{0.6}Co_{0.4}$/0.2 nm Bi has maximum Kerr rotations of 0.34, 0.33, and 0.31 and figure of merit 0.20, 0.18, 0.14 at wavelengths of 780, 650, and 430 nm, respectively. The 430 nm figure of merit is approximately 60% larger than the standard recording alloy. A hysteresis loop (shown in FIG. 6) displays perpendicular anisotropy and squareness suitable for magneto-optical recording. The measured carrier (normalized by light intensity reflected from the disk surface) exceeds a TbFeCo sample when recorded with a 1 MHz signal, 450 nsec pulse, light wavelength of 490 nm, at a velocity of 10 m/sec.

Figure 7:
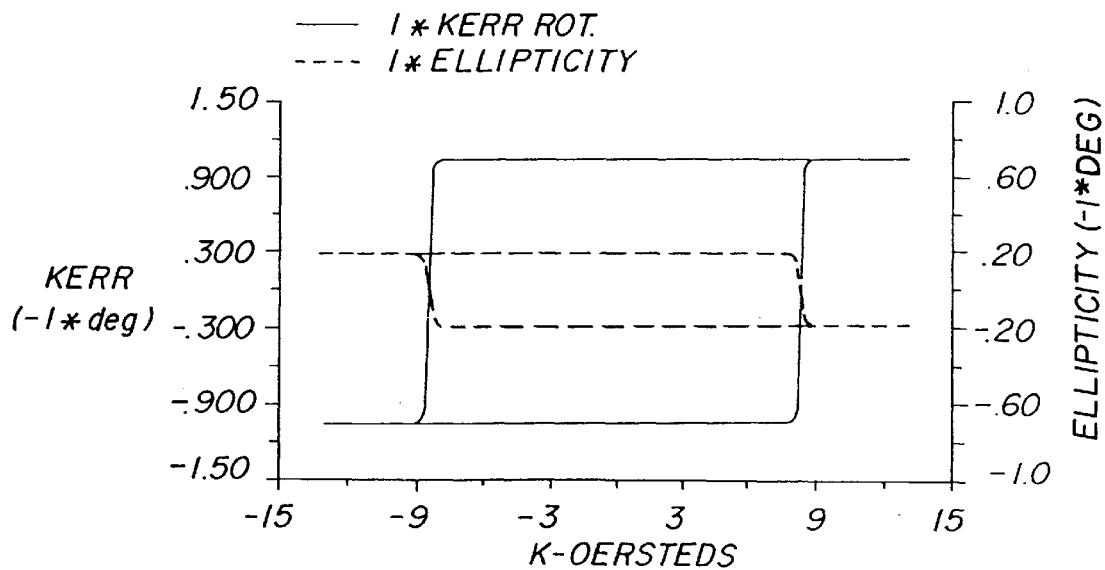
FIG. 7 shows a Kerr hysteresis loop plot of Kerr rotation vs. applied magnetic field for Example 3.

C. 0.39 nm Tb/0.5 nm $Fe_{0.6}Co_{0.4}$/0.2 nm Pb has maximum Kerr rotations of 0.34, 0.34, and 0.31 and figure of merit 0.19, 0.18, 0.15 at wavelengths of 780, 650, and 430 nm, respectively. The 430 nm figure of merit is approximately 60% larger than the standard recording alloy. A hysteresis loop (shown in FIG. 7) displays perpendicular anisotropy and squareness suitable for magneto-optical recording. The measured carrier (normalized. by light intensity reflected from the disk surface) exceeds a TbFeCo sample when recorded with a 1 MHz signal, 450 nsec pulse, light wavelength of 490 nm, at a velocity of 10 m/sec.

An important feature of the present invention is that, relative to previously used Pb and Bi doped alloys, it possesses a much larger figure of merit and coercivity at comparable composition. For example, 0.28 nm Tb/0.4 nm Fe/0.2 nm Co/0.3 nm Bi has maximum Kerr rotations of 0.45, 0.42, and 0.35 and figure of merit 0.27, 0.23, 0.16 at wavelengths of 780, 650, and 430 nm, respectively. An alloy possessing the same ratio of elements exhibits maximum Kerr rotations of 0.35, 0.33, and 0.30 and figure of merit 0.21, 0.18, and 0.13 at comparable wavelengths. Thus the figure of merit is about 25% larger in the invention relative to the alloy. This advantage persists when the MO material is embedded in a quadrilayer as commonly used for magneto-optic recording media. For example, 0.39 nm Tb/0.5 nm $Fe_{0.6}Co_{0.4}$/0.42 nm Pb has Kerr rotation 20% higher than the corresponding alloy at a wavelength of 780 nm. FIG. 4 illustrates the increase in coercivity for trilayer periods in the appropriate range relative to the alloy.

Figure 8:
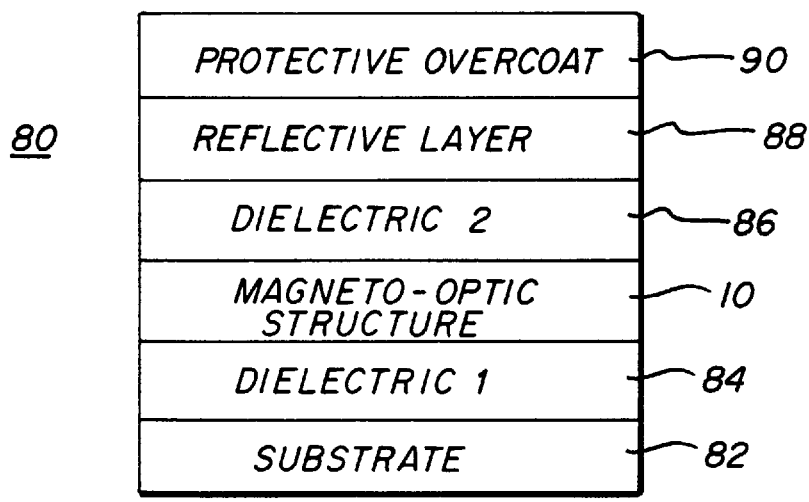
FIG. 8 shows a magneto-optic recording device including the magneto-optic recording structures of FIG. 1, FIG. 2, or FIG. 3.

FIG. 8 shows a magneto-optic device 80 in cross section. The magneto-optic device 80 includes the magneto-optic structure 10 comprising a layer stack in accordance with the present invention (see, for example FIG. 1, FIG. 2, and FIG. 3). By use of the term "device" is meant any structure which can use the magneto-optic structure in accordance with the present invention. Thus, for example, the term device includes optical disks, optical tape, and other optical recording structures. In FIG. 8 there is provided a substrate 82 which can be made of a polycarbonate or glass and a relatively thick dielectric layer 84 formed on the substrate. The dielectric layer can be made of silicon nitride or aluminum nitride. On the layer 84 is provided the MO structure 10. On the MO structure there is provided a second dielectric layer 86. Layer 86 may be made of silicon nitride or aluminum nitride. A reflective layer 88 is provided on the dielectric layer 86. Specifically, the reflective layer may be made of aluminum or aluminum alloy. Finally, a protective lacquer overcoat layer 90 is provided on the reflected layer. This layer is scratch resistant and maintains structural integrity of the media. Devices as shown in FIG. 8 have been made and provide improved performance as discussed above because of the improved MO structure 10. It will be understood by those skilled in the art that other devices can be used which will incorporate the MO structure of the present invention. One such example is a so-called trilayer MO structure in which the dielectric layer 86 is omitted.

The invention has been described in detail with particular reference to certain preferred embodiments thereof, but it will be understood that variations and modifications can be effected within the spirit and scope of the invention.

| Parts List | |
|---|---|
| 10 | magneto-optic structure |
| 12 | layer Pb, Bi or $Pb_yBi_{1-y}$ |
| 14 | layer $Fe_xCo_{1-x}$ |
| 16 | layer Tb |
| 20 | layer Fe |
| 22 | layer Co |
| 30 | layer $Tb_zPb_yBi_{1-y-z}$ |
| 80 | magneto-optic device |
| 82 | substrate |
| 84 | first dielectric layer |
| 86 | second dielectric layer |
| 88 | reflective layer |
| 90 | protective lacquer overcoat layer |

We claim:

1. A compositionally modulated magneto-optic structure, comprising a plurality of layers defining a layer stack provided on the substrate, the overall layer stack including the elements Tb, Fe, and Pb; or the elements Tb, Co, and Pb; or the elements Tb, Fe, and Bi; or the elements Tb, Co and Bi wherein at least one layer consists of Tb, Pb, Bi, PbBi alloy, TbBi alloy, TbPb alloy or TbPbBi alloy.

2. A compositionally modulated magneto-optic structure, comprising at least a four layered repeating structure, such repeating structure respectively having layers including the following materials: Pb, Bi or $Pb_yBi_{1-y}$; Fe; Co; and Tb, wherein y varies in a range from 0 to 1.

3. The compositionally modulated magneto-optic structure of claim 2 wherein the combined thicknesses of the Fe and Co layers is greater than 0.4 nm, the thickness of the Tb layer does not exceed 140% of the combined thickness of the Fe and Co layers, the thickness of the Pb, Bi, or $Pb_y Bi_{1-y}$ layer does not exceed 120% of the combined thickness of the Fe and Co layers, and the thickness of the Tb layer plus twice the thickness of the Pb, Bi, or $Pb_yBi_{1-y}$ layer does not exceed 280% of the combined thickness of the Fe and Co layer.

4. The compositionally modulated magneto-optic structure of claim 2 wherein the combined thicknesses of the Fe and Co layers is greater than 0 nm, the thickness of the Tb layer does not exceed 140% of the combined thickness of the Fe and Co layers and the thickness of the Pb, Bi, or $Pb_yBi_{1-y}$ layer does not exceed 60% of the combined thickness of the Fe and Co layers.

5. The compositionally modulated magneto-optic structure of claim 3, wherein the Tb layer thickness is 0.28 nm, Fe layer thickness is 0.4 nm, Co layer thickness is 0.2 nm, and $Pb_yBi_{1-y}$ layer thickness is 0.3 nm.

6. A compositionally modulated magneto-optic structure, comprising at least a three layered repeating structure, such repeating structure respectively having layers consisting of the following materials Pb, Bi, or $Pb_yBi_{1-y}$; $Fe_xCo_{1-x}$; and Tb, wherein x and y vary independently in a range from 0 to 1.

7. The compositionally modulated magneto-optic structure of claim 6 wherein the thickness of the $Fe_xCo_{1-x}$ layer is greater than 0.4 nm; the thickness of the Tb layer does not exceed 140% of the thickness of the $Fe_xCo_{1-x}$ layer; the thickness of the Pb, Bi, or $Pb_yBi_{1-y}$ layer does not exceed 120% of the thickness of the $Fe_xCo_{1-x}$ layer and the thickness of the Tb layer plus twice the thickness of the Pb, Bi, or $Pb_yBi_{1-y}$ layer does not exceed 280% of the thickness of the $Fe_xCo_{1-x}$ layer.

8. The compositionally modulated magneto-optic structure of claim 6 wherein the thickness of the $Fe_xCo_{1-x}$ is greater than 0 nm, the thickness of the Tb layer does not exceed 140% of the thickness of the $Fe_xCo_{1-x}$ layer; and the thickness of the Pb, Bi or $Pb_yBi_{1-y}$ layer does not exceed 60% of the thickness of the $Fe_xCo_{1-x}$ layer.

9. The compositionally modulated magneto-optic structure of claim 8 wherein the Tb layer thickness is 0.44 nm, $Fe_xCo_{1-x}$ layer is $Fe_{0.6}Co_{0.4}$ layer of thickness 0.5 nm, and Bi layer thickness is 0.2 nm.

10. The compositionally modulated magneto-optic structure of claim 7 wherein the Tb layer thickness is 0.39 nm, $Fe_xCo_{1-x}$ layer is $Fe_{0.6}Co_{0.4}$ layer of thickness 0.5 nm, and Pb layer thickness is 0.2 nm.

11. A compositionally modulated magneto-optic structure, comprising at least a two layered repeating structure, one such repeating layer structure including $Fe_xCo_{1-x}$ and the other layer consisting of $Tb_zPb_yBi_{1-y-z}$ wherein x, y, and z vary independently subject to the restriction that $0 \leq x \leq 1$, $0 < z < 1$, and $0 \leq y \leq 1-z$.

12. The compositionally modulated magneto-optic structure of claim 11 wherein the thickness of the $Fe_xCo_{1-x}$ layer is greater than 0.4 nm, the thickness of the $Tb_zPb_yBi_{1-y-z}$ layer multiplied by the atomic percentage of Tb within the layer does not exceed 140% of the $Fe_xCo_{1-x}$ layer thickness, the thickness of the $Tb_zPb_yBi_{1-y-z}$ layer multiplied by the combined atomic percentage of Pb and Bi within the layer does not exceed 120% of the $Fe_xCo_{1-x}$ layer thickness and the thickness of the $Tb_zPb_yBi_{1-y-z}$ layer multiplied by the combined atomic percentage of Pb and Bi within the layer does not exceed 280% of the $Fe_xCo_{1-x}$ layer thickness minus the thickness of the TbPb, TbBi, or $Tb_zPb_yBi_{1-y-z}$ layer.

13. The compositionally modulated magneto-optic structure of claim 11 wherein the thickness of the $Fe_xCo_{1-x}$ layer is greater than 0 nm, the thickness of the $Tb_zPb_yBi_{1-y-z}$ layer multiplied by the atomic percentage of Tb within the layer does not exceed 140% of the $Fe_xCo_{1-x}$ layer thickness, and the thickness of the $Tb_zPb_yBi_{1-y-z}$ layer multiplied by the combined atomic percentage of the Pb and Bi within the layer does not exceed 60% of the $Fe_xCo_{1-x}$ layer thickness.

14. A magneto-optic storage device, comprising:
   a) a substrate;
   b) a first dielectric layer on the substrate;
   c) a plurality of layers defining a layer stack provided on the first dielectric layer, the overall layer stack including the elements Tb, Fe, and Pb; or the elements Tb, Co, and Pb; or the elements Tb, Fe, and Bi; or the elements Tb, Co and Bi wherein at least one layer consists of Tb, Pb, Bi, PbBi alloy, TbBi alloy, TbPb alloy or TbPbBi alloy;
   d) a second dielectric layer on the layer stack; and
   e) a reflector on the second dielectric layer.

15. The device of claim 14 further including a protective overcoat layer on the reflector.

* * * * *